(12) United States Patent
Fredrickson

(10) Patent No.: US 8,708,313 B1
(45) Date of Patent: Apr. 29, 2014

(54) ELECTRICAL WIRE PULLING GUIDE AND METHOD OF PULLING WIRE INTO AN ELECTRICAL PANEL

(76) Inventor: Jeremy W. Fredrickson, Scottsdale, AZ (US)

(*) Notice: Subject to any disclaimer, the term of this patent is extended or adjusted under 35 U.S.C. 154(b) by 0 days.

(21) Appl. No.: 13/462,237

(22) Filed: May 2, 2012

Related U.S. Application Data

(60) Provisional application No. 61/518,180, filed on May 2, 2011.

(51) Int. Cl.
*B63B 35/03* (2006.01)

(52) U.S. Cl.
USPC .... 254/134.3 R; 254/134.3 FT; 254/134.3 PA

(58) Field of Classification Search
USPC .............. 254/134.3 R, 134.3 FT, 134.3 PA
See application file for complete search history.

(56) References Cited

U.S. PATENT DOCUMENTS

| | | | |
|---|---|---|---|
| 2,746,715 A * | 5/1956 | Sherrod | ................. 254/134.3 R |
| 4,358,089 A | 11/1982 | Metcalf | |
| 4,541,615 A | 9/1985 | King, Jr. | |
| 4,946,137 A | 8/1990 | Adamczek | |
| 5,271,605 A * | 12/1993 | Damron | ................ 254/134.3 FT |
| 6,672,567 B1 * | 1/2004 | Chembars | ............ 254/134.3 FT |
| 6,739,581 B1 | 5/2004 | Carlson | |
| 7,323,637 B2 | 1/2008 | Tidehack | |

* cited by examiner

*Primary Examiner* — Lee D Wilson
*Assistant Examiner* — Shantese McDonald
(74) *Attorney, Agent, or Firm* — Paul B. Heynssens Attorney at Law PLC

(57) ABSTRACT

A wire pulling guide tool and method for use with electrical panels. The tool has a pair of plates each with a plurality of spaced-apart bores. A pulley rod is insertable in selected bores to align with a conduit in the panel from which wires are to be pulled. The end plates are positioned in the panel against opposite walls and are temporarily secured at slots and set screws in the plates engage the flange on the panel. The installer extends the wire(s) to be pulled over the rod, exerting an outward pulling force which will draw the wire axially from the conduit to prevent damage to the wire or conduit.

6 Claims, 3 Drawing Sheets

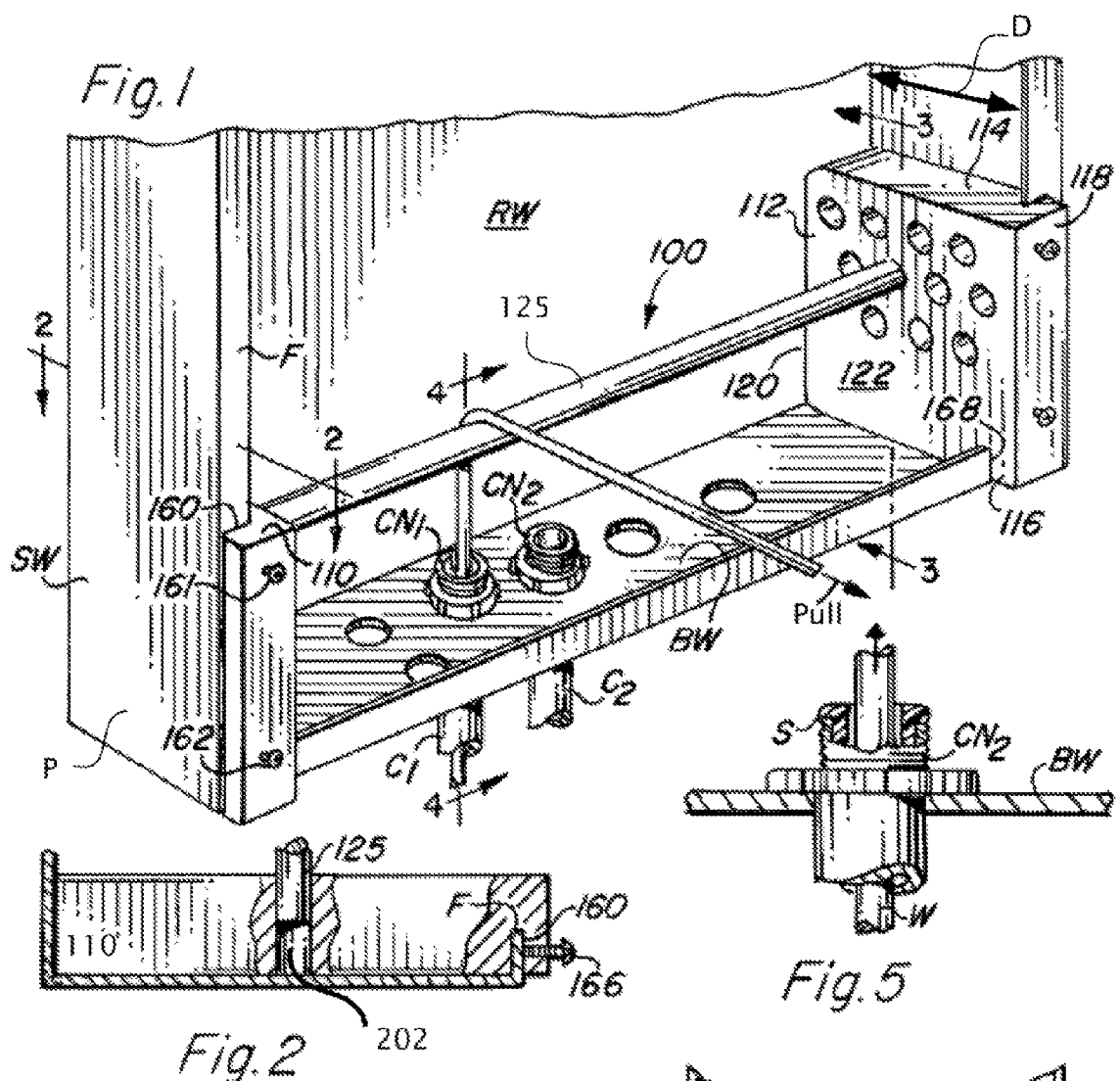
Fig. 1
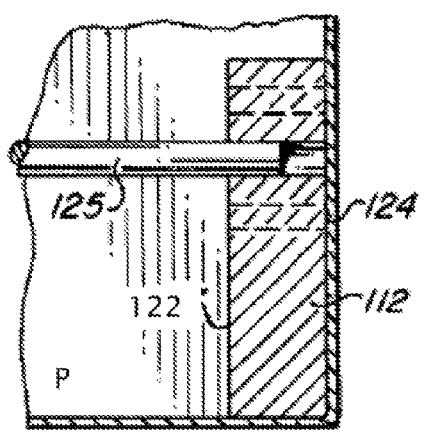
Fig. 2
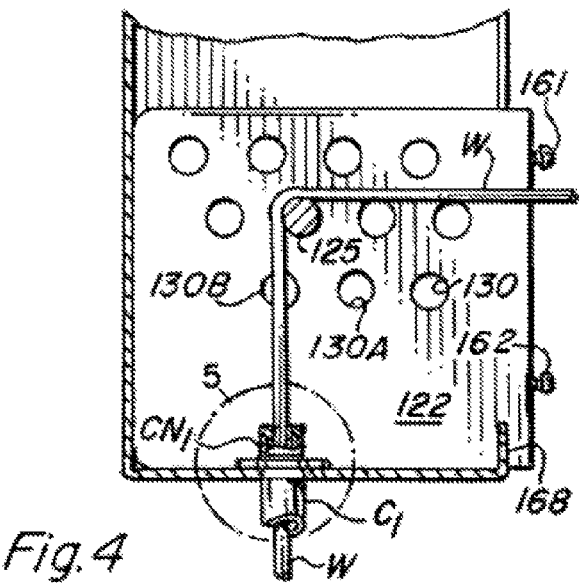
Fig. 3
Fig. 4
Fig. 5

ELECTRICAL WIRE PULLING GUIDE AND METHOD OF PULLING WIRE INTO AN ELECTRICAL PANEL

CROSS-REFERENCE TO RELATED APPLICATION

This application claims the benefit of U.S. Provisional Patent Application No. 61/518,180 filed May 2, 2011, the contents of which are hereby incorporated by reference.

TECHNICAL FIELD

This description relates generally to an accessory tool for use by electricians and more specifically to a tool to assist an installer or electrician in pulling wires, fish tapes, mule tape, jet line or the like from a conduit into an electrical panel.

BACKGROUND

Electrical panels, also known as breaker panels, are an integral part of an electrical service. The panel receives power from the utility through a meter. The panel houses a main circuit breaker and a plurality of circuit breakers for the various circuits served by the panel. From the panel radiate a plurality of branch circuits that distribute power to a number of remote locations serviced by the breaker panel.

The various wires such as the circuit feeds, neutral and ground wires are generally directed into the panel through one or more conduits secured to the panel at connectors located in the bottom wall or a sidewall of the panel. Generally, these wires may be installed by first connecting them to a fish tape and then pulling them through the conduit until the installer can grasp the wires and pull them into the interior of the panel where they may be coupled to the breakers and buss bars.

In pulling wires into a breaker panel friction can cause the wires to hang up or otherwise be difficult to draw through the conduit. Lulling a wire through a strait piece of conduit is generally easy to accomplish. However, if numerous bends are present then the difficulty increases. Also at the end of the conduit if the wire is not being pulled along the axis of the conduit then further friction is added. In particular pulling the wire into a breaker panel when the electrician must pull from a position other than substantially along the axis of the conduit entering the breaker panel can cause problems.

A particular problem often encountered is that the installer will exert a manual outward (typically away from the wall in which the panel is disposed) pulling force on the wires that is non-axial, causing the wires to be drawn from the conduit and connector at an angle with respect to the axis of the conduit. Tapes leading the wire through the conduit, such as mule tape, jet line and true tape are metal and may bend as they are pulled. This can cause the attached electrical wire to bind and possibly fray as the wire is pulled from the conduit. Further, the connectors that are often attached to the conduit and to the panel have a resilient seal which can be damaged by engagement with the wire as it is pulled from the conduit at such angles.

SUMMARY

The following presents a simplified summary of the disclosure in order to provide a basic understanding to the reader. This summary is not an extensive overview of the disclosure and it does not identify key/critical elements of the invention or delineate the scope of the invention. Its sole purpose is to present some concepts disclosed herein in a simplified form as a prelude to the more detailed description that is presented later.

The present example provides a tool or guide to be used by an electrician or installer to facilitate pulling wires through a conduit into an electrical panel. The tool has two end plates each having a depth approximately corresponding to the depth of an electrical panel, typically about 6". Each of the plates has a vertical slot engageable with the vertical inward flange on the side edges of the electrical panel. Set screws or other fasteners associated with the end plates are adjustable to engage the panel flange when the end plates are oppositely positioned in the panel.

Each plate has a plurality of apertures or bores preferably arranged in one or more rows. The bores are staggered and sized to rotatively support the ends of a rod extending across or transversely within the panel spaced above the panel wall. The location of the bores are selected so that the rod may be positioned relative to the panel wall to directly align with conduit connectors in the wall. The rod is the positioned so that wires extend over the rod, exiting the conduit axially so as to minimize damage to the wire and conduit connector. The installer, normally positioned in the front of the panel, may exert an outward manual pull on the wires in a generally horizontal direction, causing the wires to be pulled from the conduit and connector or connector in alignment with the conduit.

The position of the rod is easily adjusted to accommodate various conduit locations. The end plates are preferably metal such as steel or aluminum or may even be a durable plastic material such as polypropylene or high molecular weight polyethylene. Normally, the guide is positioned with the rod extending parallel to the bottom wall of the panel but that the guide may also be positioned to guide wires connected to a conduit extending from the side or top wall.

Many of the attendant features will be more readily appreciated as the same becomes better understood by reference to the following detailed description considered in connection with the accompanying drawings.

DESCRIPTION OF THE DRAWINGS

The present description will be better understood from the following detailed description read in light of the accompanying drawings, wherein:

FIG. 1 is a perspective view showing the guide of the present invention positioned in an electrical panel;

FIG. 2 is a sectional view taken along line 2-2 of FIG. 1;

FIG. 3 is a section view taken along line 3-3 of FIG. 1;

FIG. 4 is a sectional view taken along line 4-4 of FIG. 1;

FIG. 5 is a detail view showing a coupling or connector in the bottom wall of an electrical panel with an electrical wire within the conduit;

Like reference numerals are used to designate like parts in the accompanying drawings.

DETAILED DESCRIPTION

Figure 6:
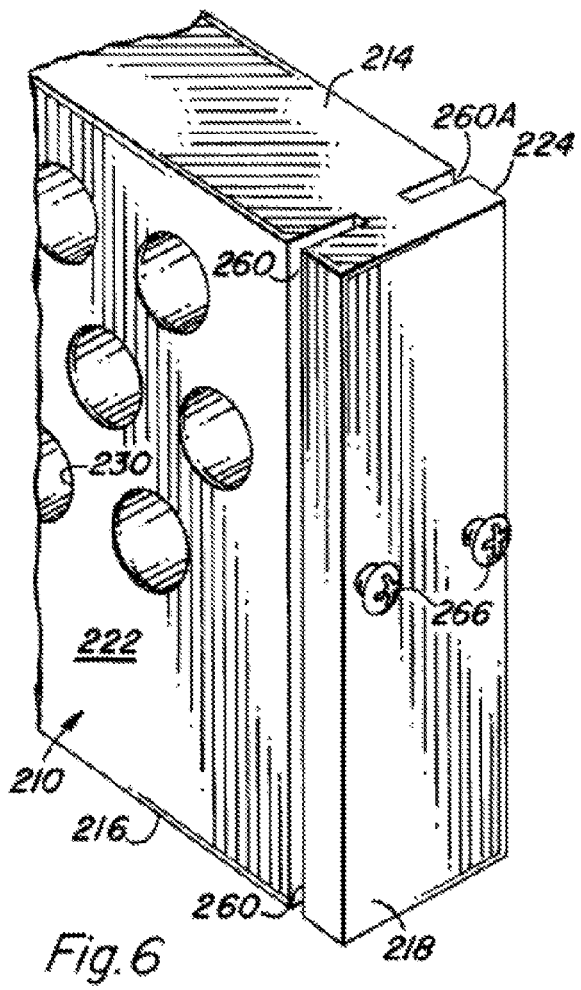
FIG. 6 is a perspective view showing an alternative example of the guide tool end plates of the present invention.

The detailed description provided below in connection with the appended drawings is intended as a description of the present examples and is not intended to represent the only forms in which the present example may be constructed or utilized. The description sets forth the functions of the example and the sequence of steps for constructing and operating the example. However, the same or equivalent functions and sequences may be accomplished by different examples.

The examples below describe a unique wire pulling guide tool and a method for employing it. Although the present examples are described and illustrated herein as being implemented in a electrical wiring system, the system described is provided as an example and not a limitation. As those skilled in the art will appreciate, the present examples are suitable for application in a variety of different types of systems in which a wire or cable must be drawn through a long tube, tunnel, or series of apertures, and that the operator's position to pull the wire or cable through the tube makes the wire or the edge of the tube the wire or cable is drawn through susceptible to damage.

FIG. 1 is a perspective view showing the guide of the present invention positioned in an electrical panel. Turning now to the drawings, particularly FIGS. 1 to 5, the unique wire pulling guide tool of the present invention is generally designated by the numeral 100 and has a rod 125 and a pair of end plates 110 and 112. Each of the end plates or blocks is preferably generally rectangular having a top 114, bottom edge 116, front edge 118 and a rear edge 120. The end plates have opposite, generally planar, sides 122, (124 of FIG. 3).

The end plates 110, 112 are preferably metal such as steel or aluminum, although the end plates may also be fabricated from other materials such as a durable plastic, as will be described. Also, the rectangular shape of the end plates 110, 112 conforms to the panel box, but other shapes may be suitable. The end plates 110, 112 each have a depth "D" which approximately corresponds to the depth of the panel P.

The panel P is shown as a representative panel having a bottom wall BW, sidewalls SW, top wall (not shown) and a rear wall RW. A flange F extends around the panel opening, extending inwardly from the sidewalls SW, top wall (not shown) and bottom wall BW. The panel door is not shown for clarity. As described above, one or more conduits C1, C2 are connected to the bottom wall BW of the panel at one or more connector fittings CN1, CN2 through which wires W may be pulled (typically with the aid of fish tape or the like) to be connected to various components that may be disposed in the panel P such as circuit breakers (not shown), ground busses (not shown) or the like. If the wires W are pulled at an angle with respect to the axis if the conduits A entering the panel P, the wires as well as seals (S of FIG. 5) disposed in the connectors CN1, CN2 may be damaged from the wires rubbing against the seals (S of FIG. 5).

The unique wire pulling guide tool 100 of the present invention is temporarily installable in the panel and has a positionably adjustable rod 125 over which the wire (or leader such as fish tape) W to be pulled can be extended so the outward pulling force ("PULL") applied by the installer on the wire W is axial with respect to the conduit at the connector CN1 as the wire W exits the connector CN1. This alignment of the wire exiting the connector with the axis of the conduit prevents the wire from rubbing against the edge of the connector CN1, and damaging the seal (not shown) disposed at the inner diameter of the connector CN1. Since the wire is pulled over the rod 125, the wire rubs against the rod 125 rather than the connector CN1, which tends to protect the seal (not shown) within the connector, and the connector itself from damage. In addition the rod may act as a pulley, rolling to further ease the pulling operation.

FIG. 2 is a sectional view taken along line 2-2 of FIG. 1 that shows the end plate disposed in the panel with the rod installed as viewed from the top surface (114 of FIG. 1). As can be seen an aperture or hole 202 is disposed in representative end plate 110 in which rod 125 is disposed. The aperture 202 may extend through the end plate 110 as shown, or partially through it. there is typically sufficient clearance between the outer surface of the rod 125 and the walls of the hole 201 to allow the rod 125 to rotate as the wire is drawn over it, as it is being pulled out from the conduit (not shown) or otherwise sharp edge. Alternatively equivalent structures that may provide a rolling bearing surface to aid in pulling the wire may be provided.

Also as seen from the top view of the end plate 110 a flange F may be used to hold the wire pulling guide in place during test. A vertical slot 160 disposed in the end plate 110 to accommodate the flange also includes a set screw 166 that can lock the end plate into position to steady the tool 100 from various positions.

FIG. 3 is a section view taken along line 3-3 of FIG. 1 that shows the front edge of the end plate 112 disposed in the panel P. An end of rod 125 is disposed in one of a variety of apertures shown. The sides 122, 144 are planar and side 124 rests flush against a side wall of panel P and against the bottom Wall of panel P.

FIG. 4 is a sectional view taken along line 4-4 of FIG. 1, which shows a representative end plate 122 installed in the panel (P of FIG. 1). The end plates 110, 112 each have a plurality of bearing bores 130, 130A, 130B, etc. The bores are arranged in rows and are staggered. Eleven bores are shown as being representative. The bores are spaced-apart having their centers on parallel, diagonal lines, which are angular with respect to the edges of the plates. The number, locations and spacing may be varied and selected to provide proper axial orientation of the wires to be pulled.

A rod 125 can be extended between selected bores 130, etc., in opposite end plates 110 of FIGS. 1, and 122, to align with the conduit, such as C1, and connector CN1, from which the wires W are to be pulled. The rod is a metal rod having a diameter selected so the rod can freely rotate within the bearing bores 130, 130A, etc., disposed in the end plates 110, 122.

To temporarily secure the guide tool 100 in the panel, the end plates each have a vertical slot (160 of FIG. 1) in their outer face or sidewall. The slots are inward of the front edge and extend only partway through the plates. A slot 168 may also be disposed at the bottom edge of the plate 122 to allow clearance for the panel flange that may be at the bottom of the panel. Threaded fasteners 161, 162 extend from the front edge of the end plate from threaded holes disposed therein. The threaded fasteners 161, 162 extend through to the slot (160 of FIG. 1) where they engage the flange F of panel P and hold the guide tool 100 in place with a compressive force. Threaded fasteners 161, 162 engage the bores and may be screws as shown, thumb screws or other type of threaded fastener.

FIG. 5 is a detail view showing a coupling or connector CN2 in the bottom wall BW of an electrical panel with an electrical wire W within the conduit. As can be seen in the figure a bushing S may be installed in the fitting CN2 to reduce friction, and or cutting of the wire, as it is being pulled out from the connector. Without the bushing piece rough edges of the conduit can damage the insulation of wire causing shorts in the wiring system.

Figure 7:
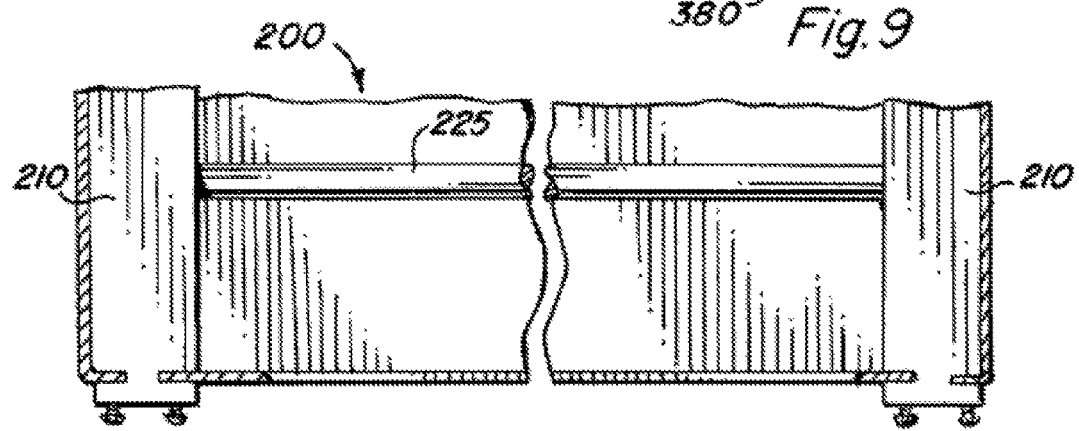
FIG. 7 is a front view of the lower portion of an electrical panel showing the example of FIG. 6 installed.

FIG. 6 is a perspective view showing an alternative example of the guide tool end plates of the present invention. FIGS. 6 and 7 show an alternate example of the end plates of the wire pulling guide tool of the present invention generally designated by the numeral 200. The guide end plate is designated by the numeral 210 and is again generally rectangular having a top edge 214, bottom edge 216, front edge 218 and a rear edge, not shown.

The end plate 210 has opposite sides 222, 224. A plurality of spaced-apart bearing bores 230 extend through the plates to receive a pulley rod (225 of FIG. 7) and position it, as described. Vertical slots 260, 260A are provided in the sides spaced inward from the front edge 218. The slots extend partway through the plate. Threaded bores extend from the front face 218 and intercept the slots 260, 260A. A threaded fasteners 266 are in engagement with the threaded bores.

The end plates 210 have two slots 260, 260A positioned on opposite sides of the plate, each of which is provided with at least one set screw 266.

FIG. 7 is a front view of the lower portion of an electrical panel showing the example of FIG. 6 installed. As can be seen in this instillation, identical pieces 210 may be used at both ends of the rod 225.

With the example of FIGS. 6 and 7, it is not necessary to fabricate separate right and left side plates, as the plate 210 may be utilized to support both ends of the pulley rod 225, providing economy of manufacture and convenience of installation.

The guide tool of the present invention is robust in construction and some durable plastics and other materials may be suitable. Plastics have the advantage of lighter weight and end plates constructed of plastic may be fabricated by machining or, in some cases, even molding.

Figure 8:
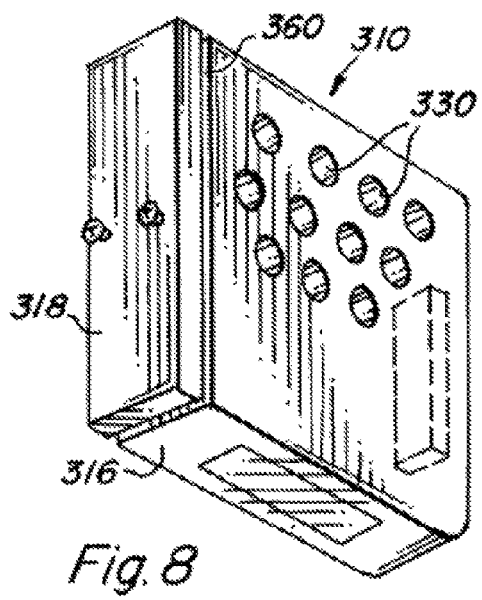
FIGS. 8 and 9 are views of yet another example of the guide tool end plates 310 of the present invention.
Figure 9:
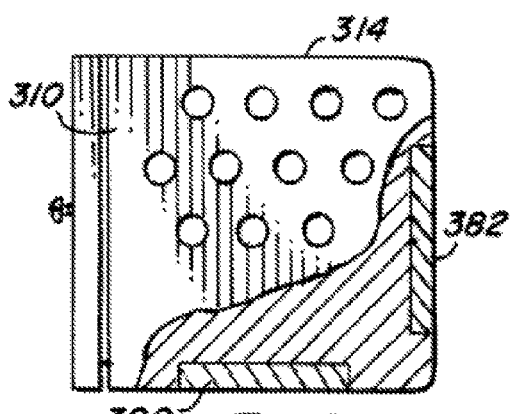

FIGS. 8 and 9 are views of yet another example of the guide tool end plates 310 of the present invention. Another example of an end plate for use with the wire pulling tool is shown and is designated by the numeral 310. The plate 310 is rectilinear or rectangular, having a top edge 314, a bottom edge 316, a rear edge 320 and a front edge 318. Staggered bearing bores 330 are provided to receive the ends of pulley rod 225, as previously described. Mounting slots 360 in the side walls of the plate are engageable with the flange on the panel sidewalls. Threaded fasteners 366 intercept the slots to secure the plates in position.

The end plates are a durable plastic. To add weight and stability, the end plate 310 is provided with magnetic inserts 380, 382 in the bottom and rear walls. The magnets will adhere to the metal panel box to assist in the positioning and temporary placement of the plates in the panel box. The example of FIGS. 8 and 9 are designed so that the plate 310 may be used at both ends of the rod 325. Although it will be understood that the plate 310 can also be fabricated as seen in FIGS. 1 to 5 for right and left side installation.

Figure 10:
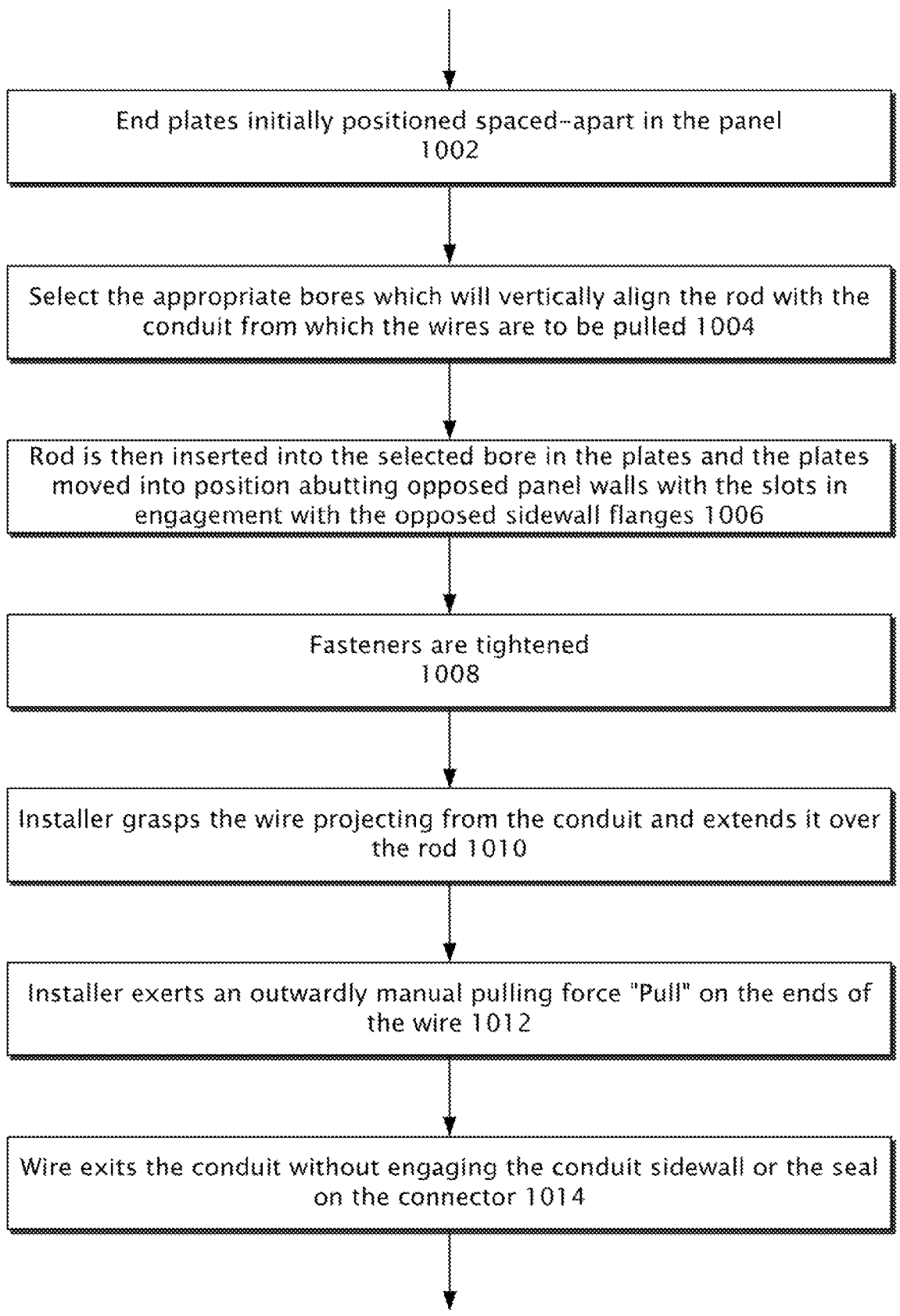
FIG. 10 is a flow diagram illustrating the process of using the wire pulling guide tool (100 of FIG. 1).

FIG. 10 is a flow diagram illustrating the process 1000 of using the wire pulling guide tool (100 of FIG. 1). Referring to FIGS. 1 to 5, the use of the tool will be described. The end plates 110, 112 are initially positioned spaced-apart in the panel, resting on the wall, abutting the rear wall at block 1002. Normally, the conduits extend through the bottom wall, as seen in FIG. 1, however, the guide tool may be used to pull wires through conduits associated with other panel walls. At block 1004 the installer can then visually select the appropriate bores which will vertically align the rod 125 with the conduit from which the wires are to be pulled, as seen in FIG. 3. At block 1006 the rod is then inserted into the selected bore in the plates and the plates moved into position abutting opposed panel walls with the slots 160 in engagement with the opposed sidewall flanges. A transverse slot 168 may be provided I the bottom edges of the end plates. The fasteners are then tightened at block 1008.

At block 1010 the installer then grasps the wire W or more likely a leader like a fish tape, projecting from the conduit C1 and extends them over the rod. At block 1012 the installer may now exert an outwardly manual pulling force "Pull" on the ends of the wire which will be translated by the pulley rod to an axial force at the conduit and connector, as shown in FIGS. 1 and 4. At block 1014 the wire exits the conduit without engaging the conduit sidewall or the seal on the connector, as best seen in FIG. 5.

It will be obvious to those skilled in the art to make various changes, alterations and modifications to the invention described herein. To the extent such changes, alterations and modifications do not depart from the spirit and scope of the appended claims, they are intended to be encompassed therein.

Those skilled in the art will realize that the process sequences described above may be equivalently performed in any order to achieve a desired result. Also, sub-processes may typically be omitted as desired without taking away from the overall functionality of the processes described above.

The invention claimed is:

1. A guide tool for temporary attachment to an electrical panel having a bottom wall, opposite sidewalls, a top wall and a rear wall, the panel having at least one conduit connected to the a wall through which wires are to be pulled, the guide tool comprising:
    a first end plate having top, bottom, front and rear edges and opposite sidewalls, the end plate defining a plurality of spaced-apart bores in at least one of the sidewalls at varying selected locations;
    a second end late having top, bottom, front and rear edges and opposite sidewalls, the second end plate having a plurality of spaced-apart bores in at least one of the sidewalls in a pattern corresponding to those in the first end plate; and
    a pulley rod insertable in selected bores in the plates to extend transversely across the panel and in alignment with the conduit, wherein a sidewall wall of the end plates each define a slot engageable with the edge of the sidewall of the panel.

2. The guide tool of claim 1 including threaded fasteners extending in the end plates engageable with the edge of the panel sidewall.

3. The guide tool of claim 1 wherein the end plates are steel.

4. The guide tool of claim 1 wherein the end plates are aluminum.

5. The guide tool of claim 1 wherein the end plates are a durable plastic.

6. The guide tool of claim 5 wherein the end plate includes at least one magnetic insert.

\* \* \* \* \*